UNITED STATES PATENT OFFICE.

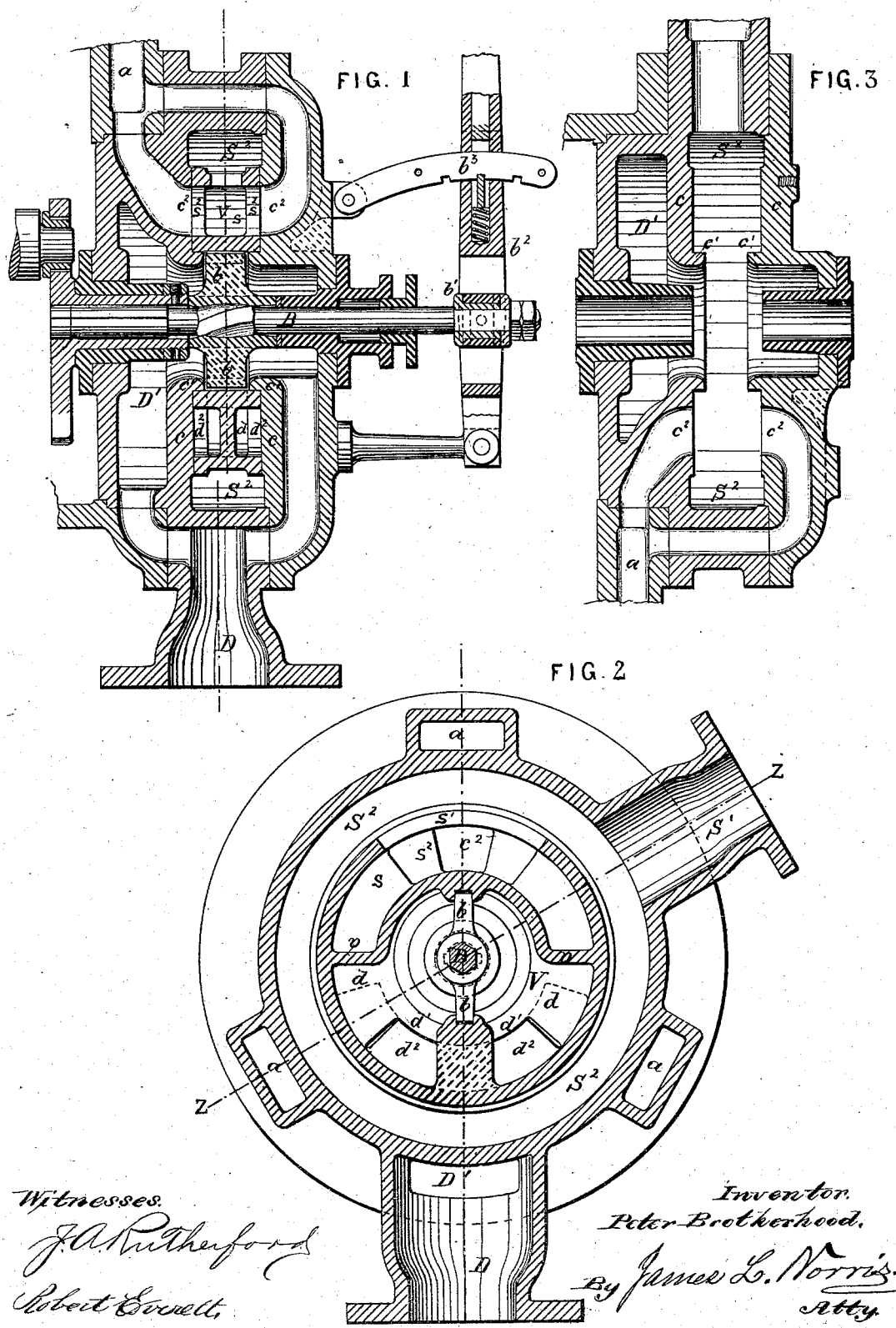

PETER BROTHERHOOD, OF CLERKENWELL, COUNTY OF MIDDLESEX, ENGLAND.

ROTARY VALVE.

SPECIFICATION forming part of Letters Patent No. 242,875, dated June 14, 1881.

Application filed May 11, 1881. (No model.) Patented in England February 17, 1881.

*To all whom it may concern:*

Be it known that I, PETER BROTHERHOOD, a citizen of England, residing at Clerkenwell, in the county of Middlesex, England, have invented an Improved Rotary Valve, (for which I have obtained a patent in Great Britain, No. 697, bearing date February 17, 1881,) of which the following is a specification.

My invention relates to rotary valves for alternating the admission and emission of steam, compressed air, or other working-fluid in engines having one, two, or more cylinders; and it consists in such a construction and arrangement of the valve and its casing that the valve is completely balanced in respect of pressure, and is consequently relieved from inequalities of action and of friction such as would otherwise cause undue wear and leakage.

In the accompanying drawings I have shown a valve according to my invention adapted to a three-cylinder engine.

Figure 1 is a section of the valve and casing, taken in a vertical plane passing through the axis of the valve. Fig. 2 is a section taken in a vertical plane at right angles to the axis; and Fig. 3 is a section of the casing, taken through the axis on the line Z Z of Fig. 2.

The valve V is in the form of a hollow cylindrical ring, having its internal cavity divided into two parts, $s$ and $d$, by partitions $v$. To the cavity $s$ there is an opening, $s'$, through the outer circumference of the ring, and from the cavity $d$ there are openings $d'$ through the inner circumference. From the cavity $s$ there are openings $s^2$ through both sides of the ring, and from the cavity $d$ there are also openings $d^2$ through both sides. The ring is placed between two stationary cheeks, $c$ $c$, fitting accurately between them, with its inner circumference bearing on a lip, $c'$, projecting inward from each cheek. Through both the cheeks $c$ $c$ there are openings $c^2$ $c^2$, opposite to one another, both of these openings communicating in each case with one of the cylinder-passages $a$. The working-fluid, regulated, if desired, by a governor, flows by a passage, $S'$, to an annular cavity, $S^2$, completely surrounding the valve V, and thence by the opening $s'$ enters the cavity $s$ of the valve. When by the rotation of the valve the side openings $s^2$ pass over a pair of the openings $c^2$ $c^2$, the fluid flows by one of the passages $a$ to one of the cylinders. The interior of the ring communicates by two side passages, D' D', with a discharge-pipe, D. When by the rotation of the valve the side openings $d^2$ pass over a pair of the openings $c^2$ $c^2$, then fluid from one of the cylinders flows by one of the passages $a$ into the cavity $d$ of the valve, thence to the middle space within the slide, and thence by the passages D' D' to the discharge-pipe D. The rotation of the valve is effected by means of two arms, $b$ $b$, on the central rotating shaft B, these arms entering grooves in the interior circumference of the valve with sufficient freedom to avoid straining the valve in any direction, and as all the pressures on the valve—external, internal, and lateral—are equally distributed over its surfaces, there is no tendency to unequal pressure, friction, or wear.

The shaft B, where the arms $b$ fit on it, may be polygonal or square, or it may be round, with the boss of the arms keyed on it. When it is desired to vary the cut-off of the working-fluid, I make the shaft, as shown in Fig. 1, with its middle part of polygonal section, shaped helically to fit a corresponding helically-polygonal hole in the boss of the arms $b$, and I extend the shaft through a stuffing-box and connect it by a swivel at $b'$ to a lever, $b^2$, provided with a spring-catch to engage in notches in a bar, $b^3$. By means of this lever the shaft can be pulled or pushed lengthwise, and its helical part, acting in the boss, will cause the arms $b$ and the valve V to turn a little round relatively to the shaft, thus causing the lateral openings $s^2$ of the valve to pass the ports $c^2$ of the casing, and so to cut off the admission of working-fluid a little sooner or later, as the case may be.

Although I have in the drawings shown the valve applied to govern the ports $a$ for three cylinders, it is obvious that a greater or less number of ports could be arranged around the valve-casing, each communicating with openings $c^2$ on both sides of the valve, so that the equality of lateral pressure is maintained.

Having thus described the nature of my invention and the best means I know of carrying it out in practice, I claim—

A rotary valve, V, of hollow annular form, with its cavity divided into two compartments, $s$ and $d$, the one compartment, $s$, having an opening, $s'$, through the outer periphery, and the other compartment, $d$, having an opening, $d'$, through the inner periphery, and both having lateral openings $s^2$ and $d^2$, equal on both sides, in combination with a casing having a supply-passage, $S^2$, extending annularly around the valve, and a discharge-passage centrally within the valve and having cheeks $c$ on each side of the valve, with lips $c'$ fitting the interior periphery of the valve, and with ports $c^2$ through the cheeks, facing the lateral openings $s'$ and $d'$ of the valve, substantially as and for the purposes herein set forth.

In testimony whereof I have signed my name to this specification, in the presence of two subscribing witnesses, this 12th day of April, A. D. 1881.

PETER BROTHERHOOD.

Witnesses:
OLIVER IMRAY,
H. E. HOPKINS.